C. C. NEALE.
LIQUID DISPENSING APPARATUS.
APPLICATION FILED MAY 19, 1919.
1,402,086.
Patented Jan. 3, 1922.
2 SHEETS—SHEET 2.
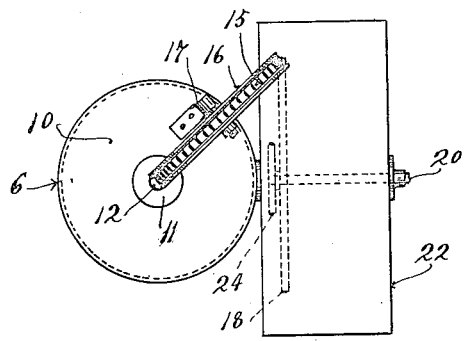
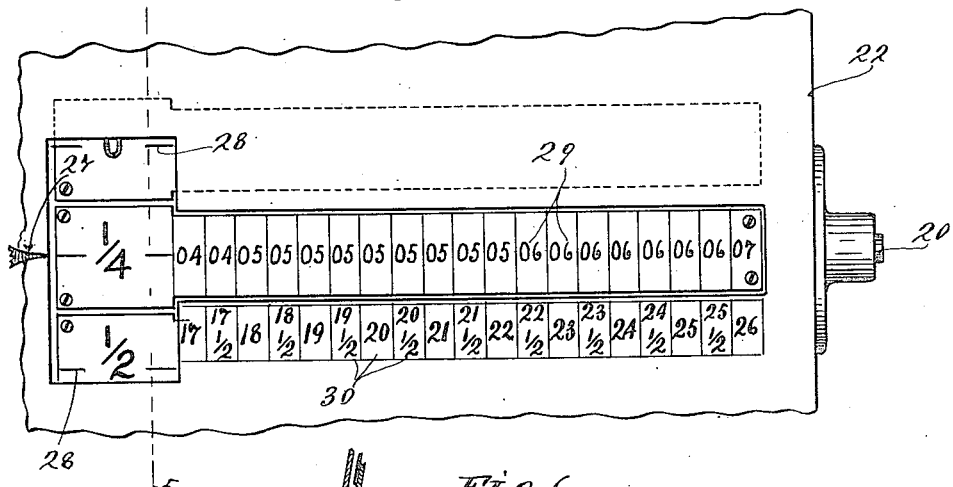
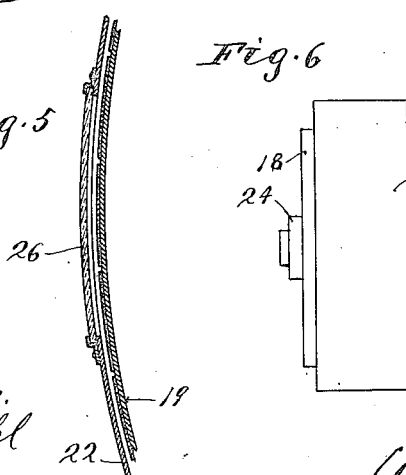
Witnesses.
A. H. Opsahl
E. C. Wells
Inventor.
Charles. C. Neale.
By his Attorneys.
Williamson Merchant

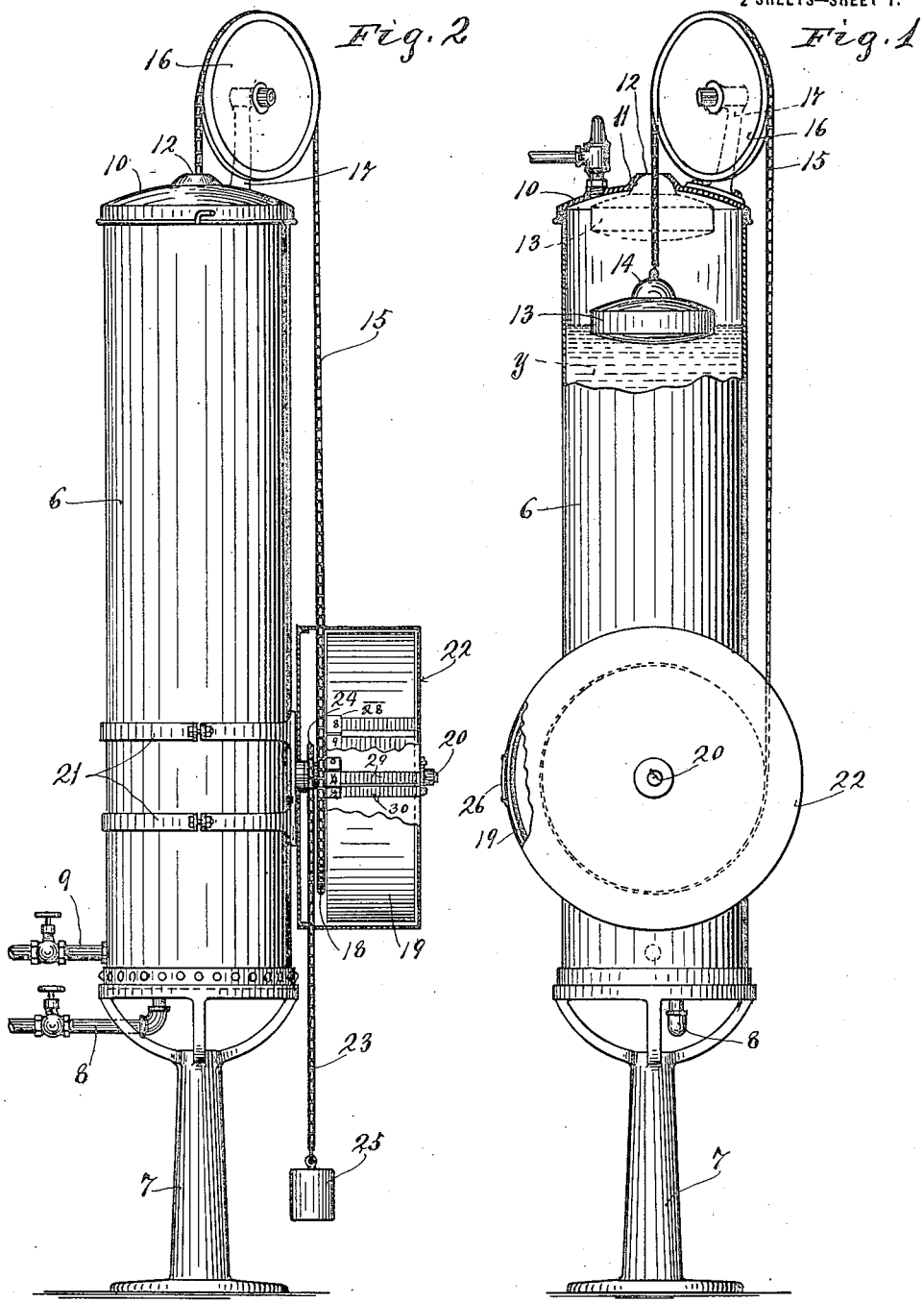

UNITED STATES PATENT OFFICE.

CHARLES C. NEALE, OF ST. PAUL, MINNESOTA, ASSIGNOR OF ONE-HALF TO FRITZ REICHMANN, OF WEBSTER GROVES, MISSOURI.

LIQUID-DISPENSING APPARATUS.

1,402,086.

Specification of Letters Patent. Patented Jan. 3, 1922.

Application filed May 19, 1919. Serial No. 298,260.

*To all whom it may concern:*

Be it known that I, CHARLES C. NEALE, a citizen of the United States, residing at St. Paul, in the county of Ramsey and State of Minnesota, have invented certain new and useful Improvements in Liquid-Dispensing Apparatus; and I do hereby declare the following to be a full, clear, and exact description of the invention, such as will enable others skilled in the art to which it appertains to make and use the same.

My invention relates to liquid measuring apparatus, and for its particular object, has the provision of a simple, very accurate and generally efficient apparatus for measuring of gasoline, kerosene, and the like, at oil vending stations.

Generally stated, the invention consists in the novel devices and combinations of devices hereinafter described and defined in the claims.

The vending tanks used at oil stations are usually about ten inches in diameter, so that in altitude, each gallon represents less than three inches. Any measuring instrument not showing greater movement than three inches per gallon will not give the required accuracy in reading, and, in fact, the United States Bureau of Standards, in their proposed specifications for visible reading measuring devices, have suggested that units of gallons be represented on indicating scales by at least four inches of lineal measurement or distance.

As one important feature, my invention provides simple means whereby this multiplied or increased indicator movement may be provided. The invention also provides an indicator of small bulk and in which the scale indication may be easily read and accurately determined because the line of vision is at a constant point, thus avoiding errors due to parallax.

In carrying out this invention, I employ a float that is arranged to ride on the surface of the liquid within the tank. This float, by a flexible cable passed over a suitable sheave or guide wheel on the top of the tank, is connected to a wheel or cylindrical rim of an indicator drum or wheel having a graduated face of materially larger diameter than the rim thereof upon which the cable is wound. The quantity indicating graduations or marks on the indicator drum extend circumferentially thereof, and the distance between marks indicating gallons will be represented by lineal dimensions much greater than the distance traveled by the float or by the upper surface of the liquid in the tank. The drum is, of course, outside of the tank, and it is under yielding strain to rotate in a direction to take up the slack of the cable. The float has sufficient weight to rotate the drum in the opposite direction. The indicator drum is a sort of differential drum with the operating cable attached to and adapted to be wound upon its smallest diameter or section.

In the accompanying drawings which illustrate the invention, like characters indicate like parts throughout the several views.

Referring to the drawings:—

Fig. 1 is a side elevation with some parts sectioned illustrating the invention applied to what may be assumed to be a gasoline tank;

Fig. 2 is a front elevation thereof, some parts being sectioned;

Fig. 3 is a plan view of the parts shown in Figs. 1 and 2;

Fig. 4 is a fragmentary view in front elevation showing portions of the indicator drum and the casing in which it is mounted;

Fig. 5 is a section on the line 5—5 of Fig. 4; and

Fig. 6 is a plan view of the drum.

The liquid containing tank 6 may be supported by any suitable means, as by a pedestal 7. The liquid may be supplied to the bottom of the tank through a valve-equipped pipe 8 and may be drawn off from the tank from a point preferably slightly above the bottom through a valve-equipped vending pipe 9. The tank, at its top, is provided with a secured head 10 which, at the axis of the tank, is formed with a valve seat 11 having a central passage 12. Working within the tank and riding upon the liquid therein contained, is a float 13 which, on its top, carries a valve 14 shown as a semispherical form and adapted to fit the seat 11 when the float is raised to an extreme position. The float 13 is attached to the inner end of a cable 15 shown as in the form of a link chain, and this cable is passed freely upward through the passage 12 and over a guide sheave 16 that is journaled to a bracket 17 on the tank cover or head 10. As will hereinafter more clearly appear, the passage 12 not only serves as a passage for cable 15, but affords a normally open vent from the top of the tank to the atmosphere, which, nevertheless, is adapted to be closed when the float is raised to an extreme position, and thereby prevent overflowing of the tank with oil, or running of oil through the top of the tank.

The outer lower end of operative cable 15 is attached to and adapted to be wound upon the cylindrical flange or a smaller portion 18 of the indicator drum 19. This indicator drum is rotatively mounted on the spindle 20 shown as secured to and projecting horizontally from clamping bands 21 that embrace the tank 6. The indicator drum is mounted within a casing or housing 22 that is also fixed to the anchoring straps 21. In its top, the housing 22 is provided with a passage through which the cable 15 works freely and, in its bottom, it is provided with a passage through which another cable, preferably in the form of a flat chain 23, works freely. The upper end of the chain 23 is attached to and works on a small wheel or drum flange 24 attached to, or otherwise carried by the indicator drum. At its lower end, chain 23 is provided with a weight 25 which operates with a constant yielding force that tends to rotate the drum in a direction reverse to the direction in which it is rotated by the weight of the float 13. Hence, of course, the float 13 must be heavy enough to overcome and raise the weight 25, but must have sufficient buoyancy to cause the same to float on the surface of the liquid within the tank. Of course, the natural floating action of the float 13 is modified somewhat by the counter action of the weight 25, but the float will maintain a constant position in respect to the surface of the liquid throughout the rising and falling of the liquid in the tank.

As shown in Figs. 2 and 4, the numerals, towit, the digits and fractions located at the left, together with the associated scale lines, indicate liquid quantities, towit, gallons and fractions thereof. These quantity or gallon indicating marks, including, of course, the fractional marks, may be located by actual tests with standard measures so that they will thereafter positively and accurately indicate exact measures.

The housing 22, at the front thereof, is provided with a transparent reading passage 26 through which the quantity measurements on the drum may be read; and to insure accuracy in reading, the casing is provided with a pointer 27 with which the circumferential quantity indicating lines 28 of the drum should be accurately aligned to give the exact measurement.

In the drawings, I have illustrated the drum as provided, in addition to its quantity indicating graduations, with price value graduations 29, and the housing 22 is provided with a cooperating fixed price scale 30, so that with this arrangement, not only quantity, but total selling price of any given quantity at a given price, within the range of the scale, may be instantly read.

In practice it will be advisable to entirely incase the cables 15 and 23, sheave 16 and weight 25 so that, in the first place, it may not be tampered with, and in the second place, will be protected from weather conditions.

Measuring apparatus of this character, as well as various other kinds, are, in practice, tested and sealed by either State or municipal weights and measuring departments, and it is highly important therefore that they be of such character that they cannot be tampered with or their accuracy destroyed without detection by the ordinary observer. In this device accuracy can only be destroyed by defacement of the scale reading which would be apparent to anyone.

What I claim is:

1. The combination with a liquid containing tank and a float therein, of a movable indicator drum dial or disc located outside of said tank but connected by a tension cable to said float, said indicator having thereon graduations and associated notations that indicate quantity and price value of various quantities of liquid drawn from said tank.

2. The combination with a liquid containing tank and a float therein, of a guide wheel located above said tank, a rotary indicator drum mounted on the outside of said tank and having liquid computing indications on the periphery thereof, said drum having a cylindrical cable flange of less diameter than its graduated peripheral portion, a cable passed over said guide wheel and attached at one end to said float and at its other end working on the reduced cable flange of said drum, whereby the periphery of said drum is given a movement exceeding that of said float, and a weight and cable connection to said drum exerting a constant force thereon tending to rotate the same in a direction to keep the said float-connected cable taut.

3. The combination with a liquid containing tank and a float therein, of a guide wheel located above said tank, a rotary indicator drum mounted outside of said tank and having indications spaced on the periphery thereof, said drum having a cylindrical cable flange of less diameter than its graduated peripheral portion, a cable passed over said guide wheel and attached at one end to said float and at its other end working on the reduced cable flange of said drum, a second cylindrical cable flange rotatable with said drum, said second cable flange being of less diameter than the first noted cable flange, and a winding cable attached to and adapted to be wound upon said second noted cable flange, said indicating drum and casing further having cooperating computed price graduations for different quantities at different prices.

In testimony whereof I affix my signature in presence of two witnesses.

CHARLES C. NEALE.

Witnesses:
 CLARA DEMAREST,
 BERNICE G. BAUMANN.